United States Patent [19]

Darling

[11] 3,832,413

[45] Aug. 27, 1974

[54] PREPARATION OF POLYNUCLEAR AROMATIC HYDROCARBONS

[75] Inventor: Dorothy E. Darling, Des Plaines, Ill.

[73] Assignee: Universal Oil Products Company, Des Plaines, Ill.

[22] Filed: Aug. 14, 1972

[21] Appl. No.: 280,692

Related U.S. Application Data

[63] Continuation-in-part of Ser. No. 105,700, Jan. 11, 1971, abandoned.

[52] U.S. Cl. .................................. 260/673, 208/138
[51] Int. Cl. ........................... C07c 3/02, C07c 3/09
[58] Field of Search ...................... 260/673; 208/138

[56] References Cited
UNITED STATES PATENTS 3,484,499  12/1969  Lester et al. ...................... 260/673
3,562,346  2/1971  Smirnov et al. .................. 260/673.5
3,579,598  5/1971  Hansford et al. ................ 260/673.5

FOREIGN PATENTS OR APPLICATIONS 622,846  9/1961  Belgium ............................. 260/673

Primary Examiner—Delbert E. Gantz
Assistant Examiner—Juanita M. Nelson
Attorney, Agent, or Firm—James R. Hoatson, Jr.; Raymond H. Nelson; William H. Page, II

[57] ABSTRACT

Polynuclear aromatic hydrocarbons are prepared by treating a low molecular weight saturated hydrocarbon in the presence of a catalysts comprising rhodium-containing compounds and in the absence of any added or extraneous gas.

8 Claims, No Drawings

PREPARATION OF POLYNUCLEAR AROMATIC HYDROCARBONS

CROSS-REFERENCE TO RELATED APPLICATIONS

This application is a continuation-in-part of my co-pending application Ser. No. 105,700 filed Jan. 11, 1971, now abandoned.

BACKGROUND OF THE INVENTION

Heretofore is has been known in the prior art that paraffinic hydrocarbons when treated with a catalyst comprising a noble metal of Group VIII of the Periodic Table in a disproportionation reaction or in a dehydrocyclization process may, in the former instance, result in the preparation of minute or trace quantities of aromatic hydrocarbons or, in that latter case, be dehydrocyclized to produce aromatic hydrocarbons. However, the requirement for these catalytic processes is that the process be effected in the presence of an added gas. For example, when paraffinic hydrocarbons are subjected to a catalytic disproportionation reaction, the feed stock is charged to the reactor in a carrier stream such as hydrogen peroxide, helium, hydrogen, etc. Likewise when subjecting paraffinic hydrocarbons to dehydrocyclization reactions in the presence of a catalyst comprising a Group VIII noble metal, the prior art required that the reaction be effected in the presence of at least one mole of added hydrogen per mole of feed stock as well as utilizing a catalyst which comprises a noble metal of Group VIII of the Periodic Table and a minor proportion of an alkaline earth metal oxide deposited on silica.

As will be hereinafter shown in greater detail, the present invention is concerned with a process for the dehydrocyclization of low molecular weight saturated hydrocarbons in which said process is effected in the absence of any added gas or carrier stream which may affect the reaction.

This invention relates to a process for preparing polynuclear aromatic hydrocarbons and more particularly, the invention is concerned with a process for treating low molecular weight saturated hydrocarbons in the absence of any added gas and in the presence of a catalytic composition of matter at an elevated temperature thereby effecting the dehydrocyclization of the saturated hydrocarbon to form polynuclear aromatic hydrocarbons therefrom.

In the chemical industry polynuclear aromatic hydrocarbons are relatively more economically desirable compounds than are the low molecular weight saturated hydrocarbons. For example, polynuclear aromatic hydrocarbons such as naphthalene are used as fungicides, in explosives, as cutting fluids, lubricants, synthetic resins, synthetic tanning agents, as preservants, as moth repellants, etc; anthracene is used as an intermediate in the preparation of dyes, callico printing, as a component of smoke screens, as scintillation counter crystals, etc; chrysene is used in organic syntheses while phanthrene is used in dyestuffs, explosives and in the synthesis of drugs.

As hereinbefore set forth it has now been discovered that polynuclear aromatic hydrocarbons such as naphthalene, methylnaphthalene, ethylnaphthalene, dimethylnaphthalene, anthracene, chrysene, phenanthrene, etc. may be prepared by treating low moleculr weight saturated hydrocarbons in the presence of certain catalytic compositions of matter and in the absence of any added gas. Inasmuch as these low molecular weight saturated hydrocarbons are relatively inexpensive and are not themselves commerically attractive compounds, it is possible to prepare polynuclear aromatic compounds therefrom which are commercially attractive from an economic viewpoint. In this respect, a particularly attractive source of low molecular weight saturated hydrocarbons which may be used as the starting material for the process of this invention comprises refinery-off gases which are mixtures of low molecular weight hydrocarbons such as ethane, propane, butane, etc. By utilizing a refinery off-gas as a starting material, it is possible to thus prepare polynuclear aromatic hydrocarbons therefrom in a commercially attractive and economically feasible manner of operation.

It is therefore an object of this invention to provide a process for preparing polynuclear aromatic hydrocarbons.

A further object of this invention is to prepare polynuclear aromatic hydrocarbons utilizing a relatively inexpensive charge stock, thereby affording a greater return on the initial investment required for operation.

In one aspect an embodiment of this invention resides in a process for the preparation of a polynuclear aromatic hydrocarbon which comprises treating a low molecular weight saturated hydrocarbon, in the absence of any added gas, with a catalyst comprising a rhodiumcontaining compound at dehydrocyclization conditions, and recovering the resultant polynuclear aromatic hydrocarbon.

A specific embodiment of this invention resides in a process for the preparation of a polynuclear aromatic hydrocarbon which comprises treating propane in the absence of any added gas with a catalyst comprising rhodium composited on alumina at a temperature in the range of from 400° to 550° C. and a pressure in the range of from about atmospheric to about 100 atmospheres, and recovering the resultant naphthalene.

Other objects and embodiments will be found in the following further detailed description of the present invention.

As hereinbefore set forth it has now been discovered that polynuclear aromatic hydrocarbons may be prepared by treating low molecular weight saturated hydrocarbons which are straight chain in configuration in the presence of a rhodium-containing catalyst. The process is effected by reacting these low molecular weight hydrocarbons with the catalyst at dehydrocyclization conditions in the absence of any added gas or extraneous carrier stream. The dehydrocyclization conditions under which this reaction is effected will include elevated temperatures in the range of from about 400° to about 550° C. and pressures ranging from atmospheric to about 100 atmospheres. The superatmospheric pressures which are utilized may be afforded by the autogenous pressure of the low molecular weight saturated hydrocarbon which is being reacted. As was previously discussed, these dehyrocyclization conditions also include the absence of any added carrier gas or stream, the presence of which has been set forth in the prior art. Examples of these carrier gases which have been used in the prior art will include helium and hydrogen. In addition, another carrier stream which is absent in the present invention but which has been utilized in the prior art includes hydrogen peroxide. By effecting the reaction in the absence of any added gas or pretreatment of the catalyst, it is possible to afford a more economical method of operation and yet achieve the formation of polynuclear aromatic hydrocarbons which also differs from the prior art that shows the formation of aromatic hydrocarbons when using an added gas stream such as hydrogen, the hydrogen being present in at least one mole of hydrogen per mole of hydrocarbon.

The catalytic compositions of matter which are utilized to effect dehydrocyclization of the low molecular weight saturated hydrocarbon will comprise rhodium-containing compounds and preferably a composite consisting of rhodium composited on an inorganic oxide support. Specific examples of these catalytic compositions of matter will include rhodium composited on alumina, rhodium composited on silica, rhodium composited on silica-zirconia, rhodium composited on silica-alumina-zirconia, the rhodium compounds being present in the finished composite in an amount in the range of from about 1 percent to about 5 percent by weight of the finished catalyst. The use of a catalyst of the type hereinbefore set forth to effect the dehydrocyclization of low molecular weight saturated hydrocarbons to form polynuclear aromatic hydrocarbons in the absence of any added gas in the form of a carrier stream is unexpected in view of the fact that other metals of Group VIII of the Periodic Table such as platinum will not effect the desired reaction.

The process of the present invention may be effected in any suitable manner and may comprise either a batch or continuous type operation. For example, when utilizing a batch type operation, a quantity of the catalyst comprising a rhodium-containing compound is placed in an appropriate apparatus such as a rotating autoclave. The autoclave is sealed and the low molecular weight saturated hydrocarbon such as ethane, propane, butane, or mixtures thereof such as are present in a refinery off-gas is charged thereto without utilizing a second gas as a carrier stream therefor. Following this, the autoclave is heated to the desired temperature and maintained thereat for a predetermined residence time which may range from about 0.1 up to about 10 hours or more in duration. At the end of this time, heating is discontinued, the autoclave is allowed to return to room temperature and any excess pressure is discharged. The autoclave is opened and the reaction mixture is recovered therefrom. After separation from the catalyst, the liquid product is then treated by conventional means including washing, drying, fractional distillation, fractional crystallization, etc., whereby the desired polynuclear aromatic hydrocarbons are separated and recovered.

In addition, it is also contemplated that the process of this invention whereby a low molecular weight saturated hydrocarbon is treated with a catalyst of the type hereinbefore set forth in a dehydrocyclization reaction to form polynuclear aromatic hydrocarbons may be effected in a continuous manner. When such a process is employed, the low molecular weight saturated hydrocarbon or a mixture of low molecular weight saturated hydrocarbons are continuously charged to a reaction zone containing the rhodium-containing catalyst, said reaction zone being maintained at the proper operating conditions of temperature and pressure. The charge stock is charged to the reactor per se and will not require the presence of any added gas as a carrier stream therefor. After passage through the reactor, at a residence time within the range hereinbefore set forth, the reactor effluent is continuously withdrawn and subjected to separation means similar to those hereinbefore set forth whereby the desired polynuclear aromatic hydrocarbons are separated and recovered while any unreacted low molecular weight saturated hydrocarbons are recycled to the reaction zone to form a portion of the feed stream. Inasmuch as the catalyst is in solid form, the continuous manner of operation may be effected by utilizing the catalyst in a fixed bed and passing the low molecular weight saturated hydrocarbon or mixtures thereof through said reaction zone in either an upward or downward flow or by utilizing a moving bed type of operation in which the catalyst and the low molecular weight saturated hydrocarbons are passed through the reaction zone either concurrently or countercurrently to each other.

Examples of polynuclear aromatic hydrocarbons which may be prepared according to the process of this invention will include naphthalene, 1-methylnaphthalene, 2-methylnaphthalene, 1,2-dimethylnaphthalene, anthracene, methylanthracene, chrysene, etc.

The following examples are given to illustrate the process of the present invention which, however, are not intended to limit the generally broad scope of the present invention in strict accordance therewith.

EXAMPLE I

In this example 8.4 g. (0.21 mole) of propane was charged to a reactor containing 8.64 g. of a catalyst comprising 1.4 percent rhodium composited on a low density alumina support. The reactor was maintained at a temperature of 507° C. while the propane was charged thereto at such a rate so that the residence time comprised 7 seconds, the total charge being maintained during a period of 1 hour. The effluent from the reactor was withdrawn and passed through a wet ice trap which was maintained at a temperature of 0° C. The liquid product which was recovered therefrom was subjected to analysis by means of a gas-liquid chromatographic analysis. This analysis disclosed the presence of naphthalene.

EXAMPLE II

To illustrate the unexpected activity of a rhodium-containing catalyst to effect a dehydrocyclization reaction in the absence of any carrier gas such as hydrogen when treating low molecular weight saturated hydrocarbons, another experiment was performed in which the propane in approximately the same amount was charged to the reactor which contained 16.67 g. of a catalyst comprising 0.75 wt. percent of platinum composited on an alumina support. The reactor was maintained at a temperature of 494° C. while the propane was charged thereto at such a rate so that the residence time comprises 7 seconds. The effluent was again recovered and passed through a wet ice trap maintained at 0° C. Analysis of the liquid which was recovered from the wet ice trap did not disclose any polynuclear aromatic products.

EXAMPLE III

In this example a reactor containing a catalyst comprising rhodium composited on silica is maintained at a temperature of 500° C. A charge stock consisting solely of butane is charged to the reactor during a period of 1 hour, the total charge stock comprising 9 g. The liquid which is recovered from the wet ice trap will, upon a gas-liquid chromatographic analysis, disclose the presence of naphthalene and anthracene.

EXAMPLE IV

To a reactor which is maintained at a temperature of 510° C. and which contains 9 g. of a catalyst which comprises 1.4 percent rhodium composited on alumina is charged 10 g. of ethane. The ethane is charged to the reactor at such a rate so that the residence time in the reactor is 10 seconds, 10 g. being charged during a period of approximately 1 hour. The reactor effluent is recovered and passed through a wet ice trap which is maintained at a temperature of 0° C. The liquid product which is recovered therefrom is analyzed by means of a gas-liquid chromatographic analyzer, said analysis disclosing the presence of naphthalene in the product.

I claim as my invention:

1. A process for the preparation of a polynuclear aromatic hydrocarbon which comprises treating a low molecular weight saturated hydrocarbon of from two to four carbon atoms per molecule, in the absence of any added gas, with a catalyst comprising a rhodium-containing compound at dehydrocyclization conditions including a temperature in the range of from about 400° to 550° C. and a pressure in the range of from atmospheric to about 100 atmospheres, and recovering the resultant polynuclear aromatic hydrocarbon.

2. The process as set forth in claim 1 in which said rhodium-containing catalyst is rhodium composited on alumina.

3. The process as set forth in claim 1 in which said rhodium-containing catalyst is rhodium composited on silica.

4. The process as set forth in claim 1 in which said low molecular weight saturated hydrocarbon is ethane.

5. The process as set forth in claim 1 in which said low molecular weight saturated hydrocarbon is propane.

6. The process as set forth in claim 1 in which said low molecular weight saturated hydrocarbon is butane.

7. The process as set forth in claim 1 in which said polynuclear aromatic hydrocarbon is naphthalene.

8. The process as set forth in claim 1 in which said polynuclear aromatic hydrocarbon is anthracene.

* * * * *